Patented Sept. 26, 1933

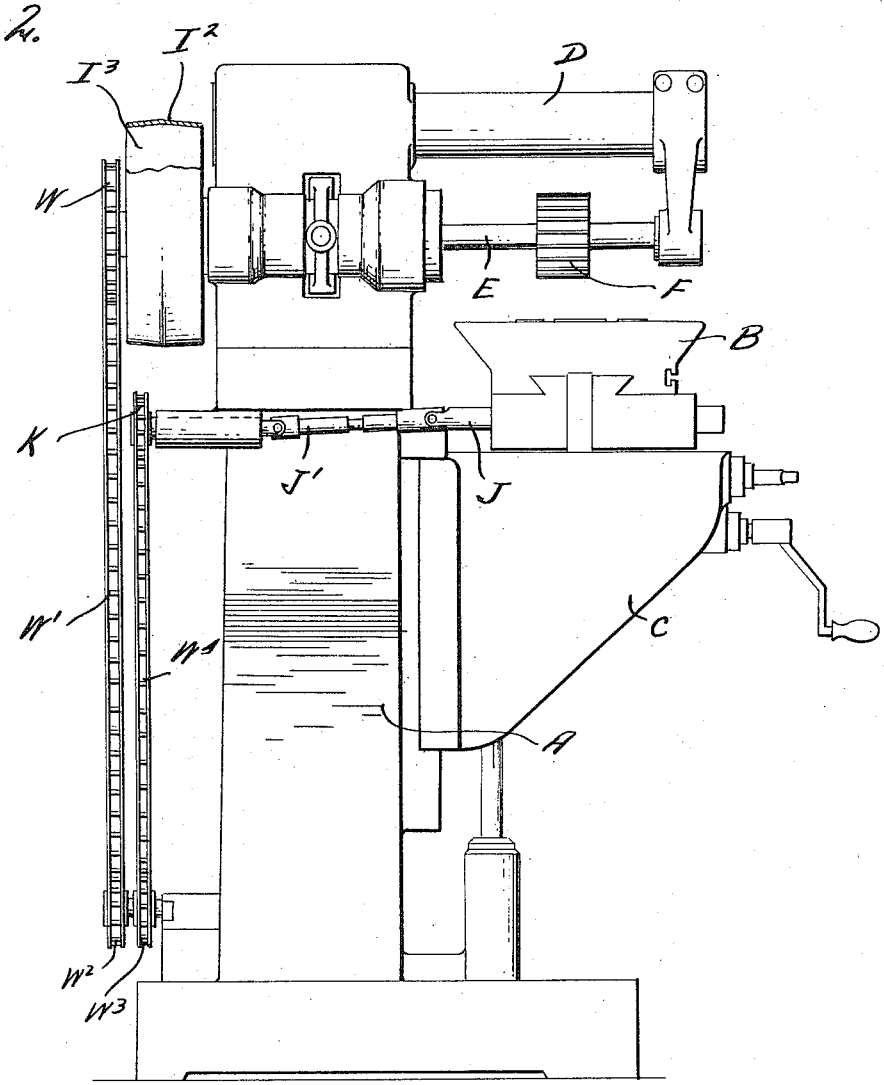

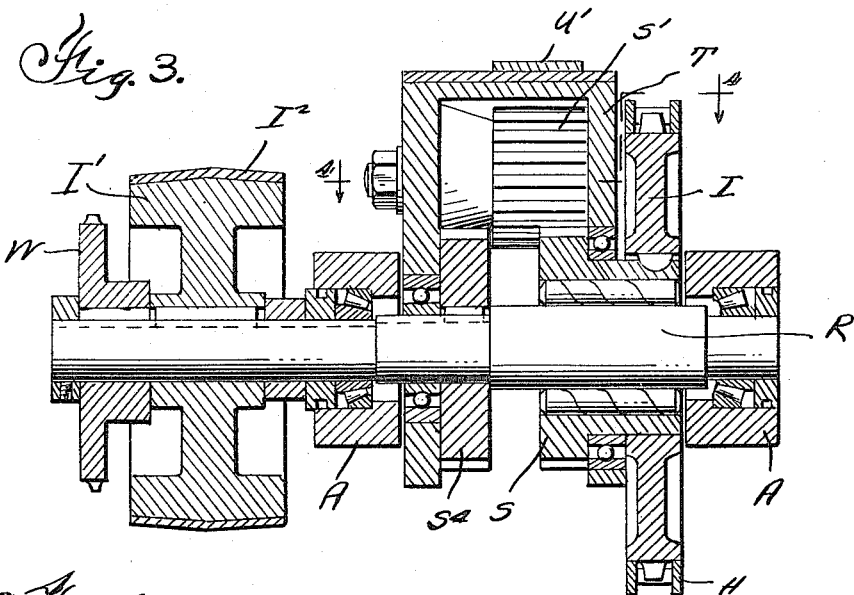
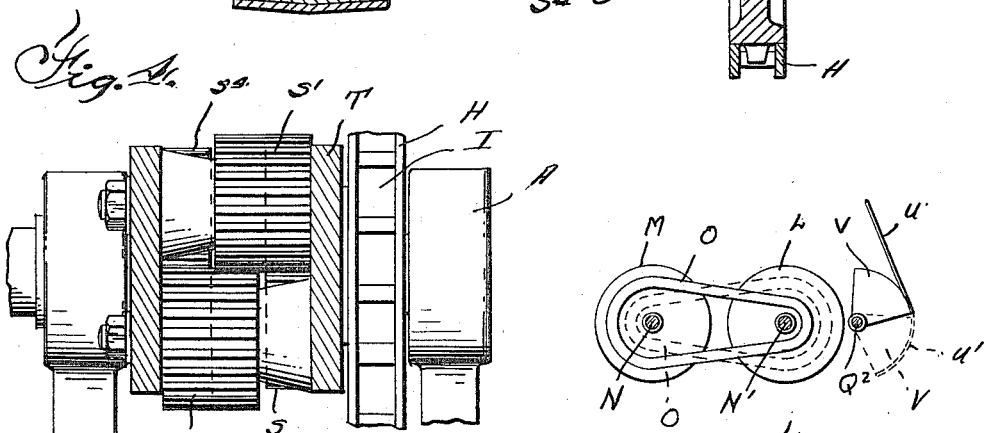
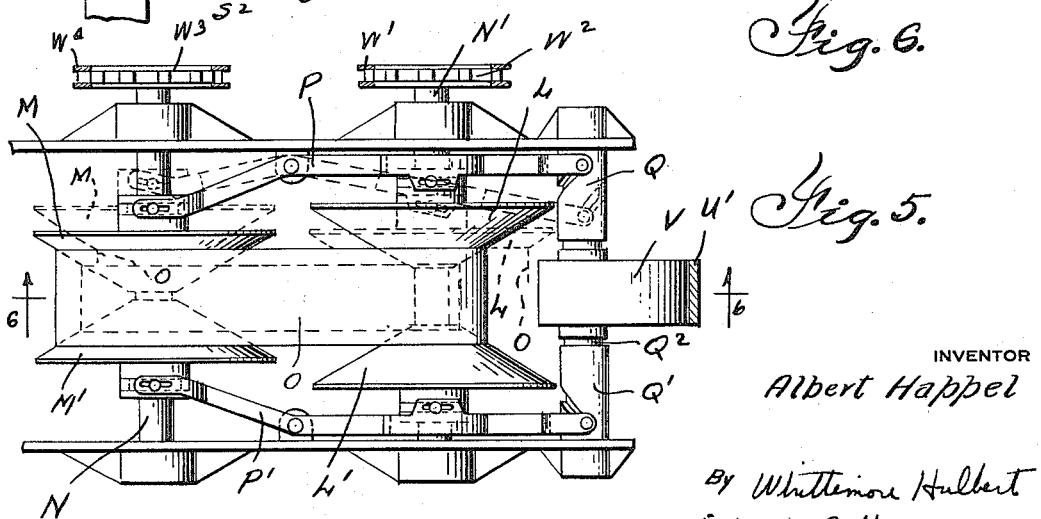

1,928,489

UNITED STATES PATENT OFFICE 1,928,489

SELF ADJUSTING FEED MECHANISM FOR MACHINE TOOLS

Albert Happel, Toledo, Ohio, assignor to Kent Owens Machine Company, Toledo, Ohio, a corporation of Ohio Application August 12, 1929. Serial No. 385,364

6 Claims. (Cl. 90—21)

The invention relates to automatic feed mechanisms particularly designed for use in connection with machine tools and it is the primary object of the invention to obtain the maximum efficiency in the operation of the tool while avoiding overloading of the same. In the performance of machining operations as for instance in milling machines, the work is frequently of such a character that a varying load is placed on the cutter. If for instance in one portion of a continuous cut the cross section which is removed by the cutter is greatly enlarged over that removed in another portion of said cut, then to avoid overloading in the heavy portion the feed or rate of advancement of the work to the cutter must be less than that permissible for the lighter portions. Various ways of compensating for this have been tried, such as manually adjusting the rate of the feed which requires the constant attention of the operator, or by automatically adjusting it by devices controlled by the shape of the work and which require resetting where the character of the work is changed or by the resistance of the work to the advancement of the cutter therethrough. All of these methods are objectionable for various reasons and only partially compensate for the varying loads placed upon the cutter.

To obtain completely automatic and accurate adjustment of the feed, I have devised a construction in which the feeding of the cutter is controlled by the actual load which resists the performance of the work. Thus in the case of a rotating milling cutter the rate of advancement of the same through the work is varied inversely to the increase or decrease to the torque resistance of the cutter in performing its cut. As this torque resistance is an exact measure of the load placed on the mechanism and is entirely independent of the direction of the cut or the pressure of the cutter against the work due to advancement therethrough I am enabled to control the feed so as to obtain as nearly as possible maximum efficiency.

My improvement is applicable to various constructions of machine tools and other devices in which work is progressively performed, but I have illustrated only one application and that to a milling machine. I have also shown this construction more or less diagrammatically as it is obvious that the construction may be varied according to the particular design of tool to which my improvement is applied.

In the drawings:

Figure 2 is a front elevation thereof;

Figure 3 is a section on the line 3—3 of Figure 1 through the differential mechanism which weighs the load on the cutter;

Figure 4 is a section on the line 4—4 of Figure 3;

Figure 5 is a plan view taken on the line 5—5 of Figure 1 of the variable speed mechanism;

Figure 6 is a diagrammatic longitudinal section on the line 6—6 of Figure 5.

Figure 1:
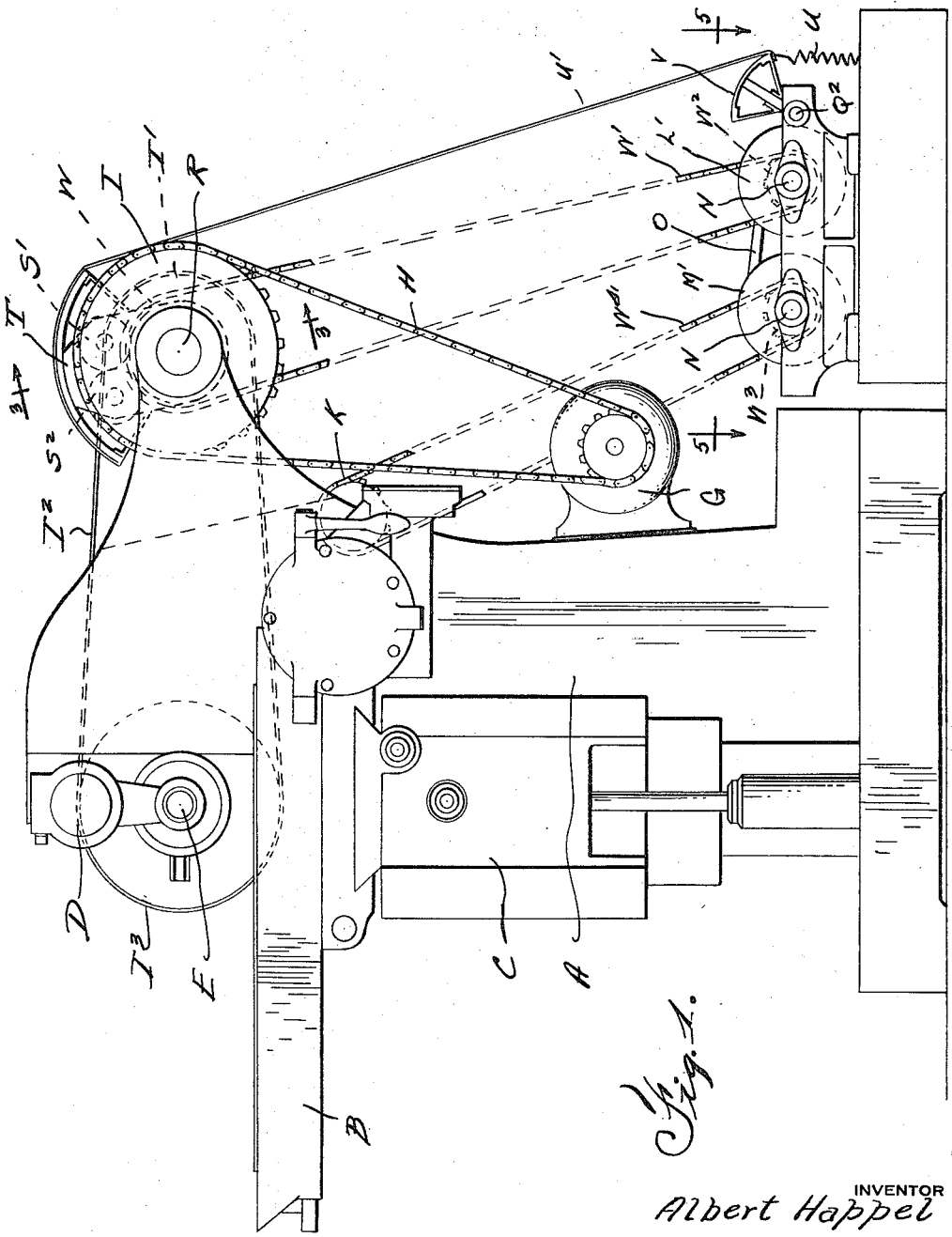
Figure 1 is a side elevation of a milling machine.

As shown, A is the frame of a milling machine provided with a usual work table B mounted on the adjustable supporting bracket C. D is the work spindle supporting frame and E the arbor on which the milling cutter F is mounted. This arbor is driven by suitable power connection such as the electric motor G, connected by the sprocket chain H with a sprocket I which through a mechanism hereinafter described drives a pulley I' and through a belt $I^2$ a pulley $I^3$ on the arbor E. The feeding of the table B which advances the work in relation to the cutter is accomplished by any suitable mechanism (not shown) but which is driven by a shaft J and universal shaft J' from a revolving wheel K mounted on the frame A.

Variable speed transmission

As the object of the invention is to vary the rate of feed in inverse proportion to the work performed by the cutter, it is essential to provide means for variable speed transmission which is intermediate the member K and the motor. For this purpose I may employ any of the well known variable speed transmissions, but the construction selected is illustrated in Figures 5 and 6. This comprises pairs of opposed conical pulleys L, L', M, M' slidably mounted upon and splined to the parallel shafts N and N'. A belt O of a truncated cone cross section connects the pulleys M, M' to the pulleys L, L' and by moving the pulleys of each pair towards or from each other the radius of the bearing of the belt thereon can be changed. Such adjustment of the pulley is accomplished by a pair of pivotal levers P, P' which are forked to engage grooved collars on the pulleys and so arranged that when the pulleys of one pair are moved toward each other those of the other pair are correspondingly separated. The levers P, P' in turn are actuated by cams Q, Q' on a rock shaft $Q^2$ operated by mechanism hereinafter described.

Torque load weighing mechanism

To measure the exact load upon the cutter in the performance of its work I have interposed a weighing mechanism intermediate said cutter and the driving pulley I. Various constructions of mechanism may be employed for this purpose but the one selected is illustrated in Figures 3 and 4 and is of the following construction: The driving sprocket I is revolubly mounted on a shaft R on which is mounted the pulley I'. Between the sprocket I and the pulley $I^3$ is arranged a differential gearing comprising a gear wheel S on the shaft R which is in mesh with a pinion S' mounted in a housing T revoluble about the axis of the shaft R. The pinion S' is connected either directly or through the medium of an intermeshing pinion S² also journalled in the housing T with a gear wheel S⁴ upon the shaft R. Thus whenever the housing T is held stationary the rotation of the shaft R will be communicated to the arbor E. It is obvious, however, that the pinions S', S² journalled in the housing T are in the nature of planetary pinions which communicate a torque to said housing. The amount of this torque depends upon the resistance to the rotation of the cutter and therefore the torque transmitted from this shaft R to the housing T is directly proportional to the load or resistance to the turning of the cutter imposed by the work. To measure this resistance the housing T is normally held from rotation by resilient yieldable means such as a spring U attached by a belt U' to a segment of the housing. The belt U' is also attached to a pivoted segment V which is attached to the shaft Q² on which the cams Q, Q' are mounted. Thus whenever there is an increase in resistance to the rotation of the cutter the balance of the spring U will be disturbed and the belt U' will be wound upon the segment T' of the housing T. At the same time this movement of the belt will rock the segment V and shaft Q² which through the medium of the cams Q, Q' and levers P, P' will change the relative positions of the pairs of cone pulleys M, M', L, L'. This in turn will alter the radius of the bearing of the belt O on each pair of pulleys so as to vary the speed of the driven shaft N'.

The variable speed transmission is located at any convenient point in the driving connection between the motor and the sprocket K which transmits movement to the shafts J and J'. As shown, this driving connection comprises a sprocket wheel W on the shaft R connected by the chain W' with a sprocket wheel W² on the shaft N' of the variable speed transmission. On the shaft N of this transmission is a sprocket wheel W³ connected by a chain W⁴ with the sprocket K. Thus whenever the load on the cutter is increased the speed of rotation of the shafts J' and J will be diminished and as the load on the cutter is decreased the speed of said shafts will be increased and this through the intervening feed mechanism (not shown) will move the table B at corresponding speeds so that the advancement of the work in relation to the cutter will be such as to maintain a more uniform load on the cutter at all times during the performance of the work.

What I claim as my invention is:

1. The combination with a rotary cutter and a work holder, of means for advancing the one relative to the other including a variable speed transmission, means for rotating said cutter including a differential transmission mechanism having an element movable to different positions by slight variations in torque load, and means actuated by said movable element controlling said variable speed transmission whereby the relative speed of advancement of said work holder and cutter is regulated to maintain a more nearly constant torque load on said cutter.

2. In a machine tool, the combination with a cutter and a work holder, means for driving the one relative to the other to perform the cutting action, means for also feeding the one relative to the other, a transmission mechanism between the driving means and the member driven including a yieldable member responsive to variations in resistance or load, and means controlled by said yieldable member for regulating the speed of advancement of said feeding means in inverse proportion to the load.

3. In a machine tool, the combination with a cutter and a work holder, of means for driving the one relative to the other to perform the cutting action, means for also feeding the one relative to the other, a transmission mechanism between said driving means and the member driven including a yieldable member responsive to variations in resistance or load, a variable speed mechanism for said feeding means, and a connection between said yieldable member and variable speed mechanism for regulating the speed of advancement of said feeding means in inverse proportion to the load.

4. In a machine tool, the combination with a cutter and work holder relatively rotatable to perform the cutting action, of means for relatively feeding said cutter and work holder, means for driving the rotating member, a transmission mechanism intermediate said driving means and rotating member including a yieldable member responsive to variations in torque resistance or load, and means controlled by said yieldable member for regulating the speed of advancement of said feeding means in inverse proportion to the load.

5. In a machine tool, the combination with a cutter and work holder relatively rotatable to perform the cutting action, of means for feeding the one relative to the other, means for driving the rotating member at substantially constant speed, a transmission mechanism beween said driving means and rotating member including a yieldable member responsive to torque resistance or load, and means controlled by said yieldable member for regulating the speed of advancement of said feeding means in inverse proportion to the load.

6. In a machine tool, the combination with a cutter and work holder relatively rotatable to perform the cutting action, of means for feeding the one relative to the other, means for driving the rotating member, a transmission mechanism between said driving means and rotating member including a yieldable member responsive to torque resistance or load, a variable speed mechanism for driving said feeding means, and a connection between said yieldable member and variable speed mechanism for regulating the speed of advancement of said feeding means in inverse proportion to load.

ALBERT HAPPEL.